United States Patent [19]

Eddy

[11] 3,814,862

[45] June 4, 1974

[54] MATRIX-PROTECTING SUPERVISORY ARRANGEMENT FOR A COMMUNICATION SWITCHING SYSTEM

[75] Inventor: John W. Eddy, Villa Park, Ill.

[73] Assignee: GTE Automatic Electric Laboratories Incorporated, Northlake, Ill.

[22] Filed: Nov. 2, 1972

[21] Appl. No.: 303,156

[52] U.S. Cl. .......................... 179/18 GE, 340/166 R

[51] Int. Cl. ....................... H04q 3/495, H04b 15/00

[58] Field of Search ..................... 179/18 F, 18 GE; 340/166 S, 166 R; 317/11 R, 11 C

[56] References Cited

UNITED STATES PATENTS 3,343,129 9/1967 Schmitz .......................... 340/166 R 3,519,840 7/1970 Traina ............................ 340/166 R 3,536,847 10/1970 Adelaar et al. ................. 179/18 GE

*Primary Examiner*—Thomas A. Robinson

*Attorney, Agent, or Firm*—B. E. Franz

[57] ABSTRACT

A supervisory arrangement for a communication switching system having at least one switching matrix and a marker for establishing a path through the matrix to a supervisory unit, such as a register junctor, includes a seizure circuit responsive to the establishment of the path for generating a control signal and for supplying it to a matrix-protecting circuit in the supervisory unit, which in turn connects the path to a source of potential, whereby the matrix crosspoints are not subjected to unwanted switching transients during the establishment of the path.

11 Claims, 1 Drawing Figure

PATENTED JUN 4 1974 3,814,862
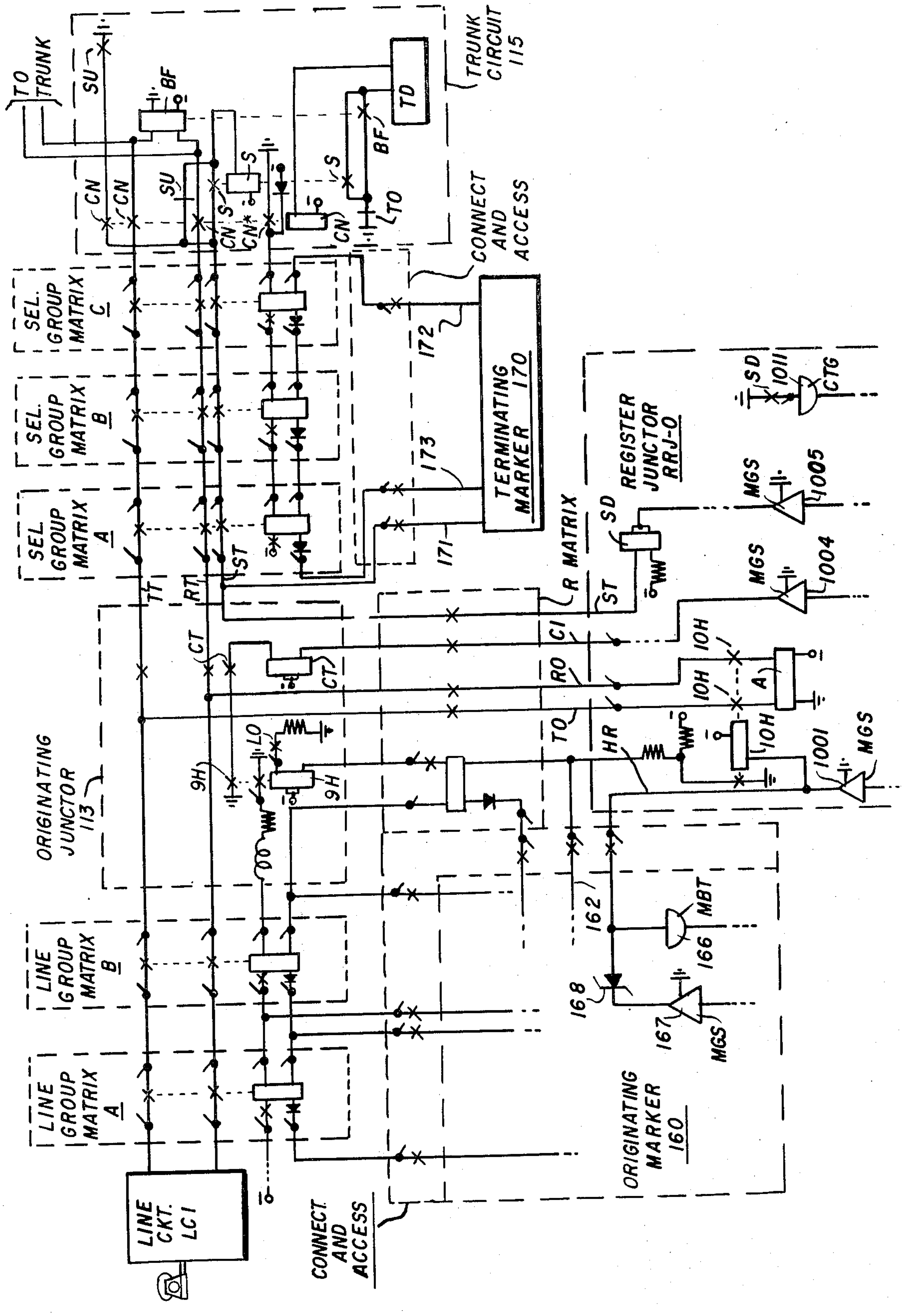

MATRIX-PROTECTING SUPERVISORY ARRANGEMENT FOR A COMMUNICATION SWITCHING SYSTEM

BACKGROUND OF THE INVENTION

1. Field of the Invention

The present invention relates to a matrix-protecting supervisory arrangement for a communication switching system, and it more particularly relates to a supervisory arrangement for protecting a switching matrix of the system against crosspoint-damaging voltage surges during the establishment of a path through the matrix to a supervisory unit.

Sensitive fast-acting matrix-crosspoint switching devices, such as certain fast-switching reed relays, have been employed in communication switching systems, such as common control telephone systems having switching matrices in the communication paths. In such a system, a marker establishes a path through a switching matrix to a supervisory unit, such as a junctor, which provides a source of potential for the path. However, the contacts of the sensitive crosspoint reed relays have been subject to damaging voltage surges during switching as a result of certain circuit conditions, whereby the damage caused to the contacts of a reed relay could affect adversely the characteristics of the transmission paths, or even cause permanent welding of the contacts into a closed position so that the damaged crosspoints must be repaired or replaced. The circuit conditions resulting in the undesirable switching transients are caused in part by distributed capacitance over various different lengths of cables interconnecting matrix stages and interconnecting the stages and the supervisory units, the distributed capacitance being leakage capacitance between the conductors of the cables and also between the conductors and the mounting frames. Such capacitance is charged by the source of potential for the path to be established prior to closing the crosspoint contacts and thus when the contacts close a discharge therethrough from the capacitance causes a large unwanted instantaneous surge current. Moreover, contact bounce further adds to the problem since the time constant of the charging capacitance is ordinarily smaller than the open interval of the bounce. Also, the source of potential is oftentimes connected through an inductance, such as a relay coil, which in most instances may not be diode suppressed for transmission reasons, and thus during the contact bounce intervals a back electromotive force is developed in the inductance to cause still larger surges to be produced. A similar, but somewhat less serious problem occurs during the opening of the crosspoint contacts since the distributed line capacitance and ringer capacitors remain charged even after the subscriber disconnects and thus an undesirable discharge surge could damage the crosspoints. Therefore, it would be highly desirable to have an arrangement which would protect the crosspoints of the switching matrix of a communication switching system from becoming damaged or otherwise adversely affected by switching transients in an efficient and inexpensive manner.

2. Summary of the Invention

Therefore, the principal object of the present invention is to provide a new and improved arrangement for protecting matrix crosspoints of a communication switching system from becoming damaged or otherwise adversely affected by switching transients in an efficient and economical manner.

Briefly, according to the invention, there is provided a supervisory arrangement, which includes a seizure circuit responsive to the establishment of the path through the switching matrix for generating a control signal and for supplying it to a matrix-protecting circuit in the supervisory unit to which the path is established. The matrixprotecting circuit connects the path to a source of potential in response to the control signal so that the crosspoints of the switching network are not switched directly to the source of potential and thus they are not unduly stressed by unwanted switching transients.

CROSS-REFERENCES TO RELATED APPLICATIONS

A system incorporating the principles of the present invention is disclosed in United States patent application Ser. No. 130,133, filed Apr. 1, 1971 by K. E. Prescher, R. E. Schauer and F. B. Sikorski for a PROCESSOR CONTROLLED COMMUNICATION SWITCHING SYSTEM, in United States patent application Ser. No. 201,851 filed Nov. 24, 1971 by S. E. Puccini for a DATA PROCESSOR WITH CYCLIC SEQUENTIAL ACCESS TO MULTIPLEXED LOGIC AND MEMORY, and in U.S. Pat. application Ser. No. 281,586 filed Aug. 17, 1971 by J. W. Eddy for an INTERLOCK ARRANGEMENT FOR A COMMUNICATION SWITCHING SYSTEM.

DESCRIPTION OF THE DRAWINGS

These and further objects of the present invention will be understood more fully and completely from the following detailed description when considered with reference to the accompanying drawing, which is a schematic and functional block diagram of a portion of the switching network and markers with associated junctors in accordance with the present invention.

DESCRIPTION OF THE PREFERRED EMBODIMENT

Referring now to the drawing, there is shown a portion of a telephone switching system, which includes a matrix-protecting supervisory arrangement constructed in accordance with the present invention. The system is disclosed more completely in the foregoing patent applications and comprises a switching portion including a line group having a line group matrix A and a line group matrix B and an R matrix together with a plurality of line circuits, such as the line circuit LC1, a plurality of selector groups including a selector group matrix A, a selector group matrix B, and a selector group matrix C, a plurality of originating markers, such as the marker 160 (only a portion of which is shown in the drawings), and a plurality of terminating markers, such as the marker 170. The system further includes a common portion having a registersender group which has 192 register junctors, such as the register junctor RRJ-O (only a portion of which is shown in the drawings) serving as peripheral units for conveying information to and from the register-sender common equipment. The line group includes the reed-relay switching network stages A, B. C and R for providing 1,000 local lines with a means of accessing the system for originating calls and for providing a means of terminating calls destined for local customers. The selector group forms an intermediate switch and may be considered the call distribution center of the system, which routes calls appearing on its inlets from line groups or from incoming trunks (not shown) to appropriate destinations, such as local lines or outgoing trunks (not shown) to other offices, by way of the reed-relay switching stages A, B. and C. Thus, the line group, the selector group and the trunk register group (not shown) form the switching network for this system and provide full metallic paths through the office for signalling and transmission. Each one of the matrices of the line group and the selector group comprises a reed-relay crosspoint switching matrix.

The originating marker 160 provides high-speed control of the switching network to connect calls entering the system to the register junctors of the register-sender group. The terminating marker 170 controls the switching networks of the selector group for establishing connections.

The register-sender group provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the registersender group. The group of register junctors functioning as peripheral units serve as an interface between the switching network and the common logic circuits (not shown) of the register-sender group. The common logic register-sender group includes a core memory (not shown) for storing information on a time-division multiplex sequential access basis.

The line group in addition to the switching stages includes a plurality of originating junctors, such as the originating junctor 113 (only a portion of which is shown in the drawings) and a plurality of trunk circuits, such as the trunk circuit 115 (only a portion of which is shown in the drawings) and a plurality of terminating junctors (not shown). On an originating call the line group provides concentration from the line terminals to the originating junctor. Each originating junctor provides the split between calling and called parties while the call is being established, thereby providing a separate path for signalling. On a terminating call, a portion (not shown) of the line group provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signalling path to the register junctor RRJ of the register-sender group, and at the same time provides a separate signalling path from the register-sender group to the selector group for outpulsing, when required. The originating junctor isolates the calling line until cutthrough is effected, at which time the calling party is switched through to the selector group inlet. The originating junctor also provides line lockout. The terminating junctor is used for every call terminating on a local line and remains in the connection for the duration of a call, and the trunk circuit 115 is used for outgoing trunk calls.

The selector group is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as hereinafter described in greater detail. The originating marker 160 detects calls for service in the line and trunk register group, and controls the selection of idle paths and the establishment of connections through these groups. On line originated calls, the originating marker detects calls for service in the line matrix, controls path selection between the line and originating junctors and between originating junctors and register junctors.

The terminating marker 170 controls the selection of idle paths in the establishing of connections for terminating calls. The terminating marker 170 closes a matrix access circuit which connects the terminating marker to the selector group containing a call-for-service, and if the call is terminated in a local line, the terminating marker 170 closes another access circuit (not shown) which in turn connects the marker to the line group. The marker connects an inlet of the selector group to an idle junctor or trunk circuit. If the call is an idle line the terminating marker selects an idle terminating junctor and connects it to a line group inlet (not shown), as well as connecting it to a selector group inlet. For this purpose, the appropriate idle junctor is selected and a path through the line group and the selector group is established. The example shown is a termination to an outgoing trunk.

SYSTEM OPERATION

In operation, a subscriber initiates a call by lifting his hand set, and in so doing, the line circuit, such as the line circuit LC1, detects the initiation of the call and sends a signal via a connection (not shown) through the connect and access circuit to the originating marker 160, which in turn identifies the calling line initiating the call. Thereafter, the originating marker 160 establishes a path from the calling line through the line circuit, A and B matrices of the line group, an originating junctor, such as the originating junctor 113, and the R matrix to an idle register junctor, such as the register junctor RRJ-O. In order to establish this connection, negative battery potential is connected from the originating marker 160 via the connect and access circuit to the left-hand side of the lower winding of the selected relay coil of the matrix A and to the lower side of the left-hand winding of the selected relay coil of the R matrix, ground potential being connected via the connect and access circuit to the lead connecting the selected R matrix relay coil and the selected relay coil of the matrix B for operating the selected relays of the A, B and R matrices to pull the A, B and R matrices. Thereafter, negative battery potential through a relay 9H and the right-hand winding of the selected R matrix relay coil is extended to a lead 162 to the originating marker 160 when the selected R matrix relay coil is operated to close its normally open contacts in series with its right-hand winding, whereby the originating marker 160 detects that the path has been established. In response to the detection of the established path, the originating marker 160 via a main battery test gate 166 verifies the establishment of the path including the transmission leads TO and RO through the connect and access circuit to the register junctor RRJ-O by detecting a negative battery potential through the relay coil 10H of the register junctor RRJ-O and a lead HR through the connect and access circuit to the input to the gate 166. In response to verifying the establishment of the path through the connect and access circuit to the selected register junctor RRJ-O, the originating marker 160 operates a main ground switch 167 to connect ground potential through a Zener diode 168 to the lead HR via the connect and access circuit to the register junctor relay coil 10H for the purpose of operating it, main battery test gates and main battery switches being electronic circuits described in the foregoing mentioned Puccini patent application. As a result, the relay 10H operates and closes its normally-open contacts to connect ground potential through a current-limiting resistance to hold the selected R matrix relay coil operated in series with the relay 9H of the originating junctor 113. As a result, the relay 10H operates to connect ground potential through a resistance and inductance to the upper windings of the selected relay coils of the A and B matrices for holding them operated in series. Also, in accordance with the present invention, the relay 10H closes a pair of normally open contacts to connect the leads TO and RO from the originating junctor 113 through the R matrix to a battery-feed relay A of the register junctor RRJ-O, for the purpose of supplying battery feed for the transmission path. It should be noted that in accordance with the present invention, the relay 10H isolates the battery-feed relay A and its associated connections to the main battery source of potential, from the transmission path when the contacts of the matrices A, B and R are being closed, thereby protecting them from the foregoing-mentioned unwanted transient surges. Thereafter, the relay A operates and the register-sender group (not shown) responds thereto and causes the main ground switch 1001 of the register junctor RRJ-O to connect ground potential to the left-hand side of the relay coil 10H for holding it operated. In so doing, the ground potential connected to the lead HR is detected by the main battery test gate 26 as distinguished from a somewhat lower potential due to the break-down voltage of the Zener diode 168, whereby the originating marker 160 determines that the originating path has been established and thereafter releases to serve other connections.

During the terminating portion of the call, the terminating marker 170 via its leads 172 and 173 pulls selected ones of the relay coils of the selector group matrices A, B and C via leads 172 and 173 for extending the transmission path leads TT and RT through the selector group matrices A, B and C to the trunk circuit 115. Thereafter, the terminating marker 170 connects a ground potential via its lead 171 to the lead ST for extending ground through the selector group matrices to the trunk circuit 115 for operating a relay S via break contacts of a relay (not shown) therein and for extending the ground potential through the originating junctor 113 and the R matrix to operate a relay SD in the register junctor, the relay SD having two balanced windings connected in series. The relay S of the trunk circuit 115 operates and applies a ground signal via break contacts of a time out relay TO (not shown) to a slow-ro-release time delay circuit TD, which in turn operates a relay CN. Thereafter, the relay CN operates and connects the leads TT and RT via the selector group matrices to a battery feed relay BF, whereby in accordance with the present invention the battery potential via the relay BF is not applied to the transmission path until after the selector group matrices have completely established the connection and successfully closed their contact so that unwanted transients do not adversely affect the selector group relay contacts. The circuit TD provides a release delay of from 130 to 300 milliseconds, and is an electronic circuit, such as the circuit disclosed in U.S. Pat. application 139,336, filed May 1, 1971, by Jeffrey P. Mills, for RELAY RELEASE DELAY CIRCUIT. After the relay BF operates, it connects ground potential via the break contact TO of a time-out relay (not shown) and make contacts of the relay BF through the time delay circuit TD to hold operated the relay CN. Also, after the relay CN closes its make contacts to connect the transmission path to the battery feed relay BF, it then closes a special make contact to connect ground potential to the upper windings of the selector group matrix relay coils for holding them operated, the special make contact being mechanically operated such that, upon release, it will open subsequent to the opening of the transmission path contacts.

After the relay SD of the register junctor operates, it connects ground potential via its make contacts to energize a test gate 1011 for instructing the register-sender group that the terminating marker 170 has connected the ground 171 to the lead ST and that a connection has been successfully completed between the selector group matrix A and the register junctor. Thereafter, the register-sender energizes a main ground switch 1005 of the register junctor RRJ-O for connecting ground potential to both of the windings of the relay SD, whereby the ground potential from the main ground switch 1005 is connected through the upper winding of the relay SD to the ST lead and thus holds the relay S of the trunk circuit 116 operated. After a predetermined time delay interval, the terminating marker 170 removes the ground potential from the lead ST via the lead 171 so that the direction of the current flowing through the upper winding of the relay SD is reversed to cause the fields produced by the windings to be in opposition, whereby the relay SD restores. With the contacts of the relay SD released, the signal produced by the gate 1011 of the register junctor becomes false. Insofar as the register junctor is concerned, the last step of the terminating portion of the call occurs when the register-sender group causes the main ground switch 1004 to connect ground to lead C1 for the purpose of operating a relay CT of the originating junctor 113 to extend the originating transmission path TO and RO to the terminating transmission path TT and RT, whereby the relay CT is held operated via its make contacts and the make contacts of the holding relay 9H and the voice connection can be completed to the trunk.

Upon completion of the call, the battery feed relay BF restores to remove the holding ground potential from the relay CN via the time delay circuit TD, whereby the relay CN restores and opens its contacts in the transmission path to disconnect the battery potential via the relay BF to the transmission leads TT and RT so that the selector group matrix relay contacts are protected when they are subsequently opened by insuring that no current is flowing through them when they are opened. In order to insure that the selector group matrices are released only after the battery feed relay BF is disconnected from the leads TT and RT, the special make contacts of the CN relay open the holding path to the selected selector group relay coils only after the transmission contacts of the CN relay open. Moreover, a diode (not shown) is connected in parallel with the relay coils of the selector group matrices and so polarized to retard or suppress the restoration of the selector group relay coils so that they are rendered slow to restore. As a result, in accordance with the present invention, the contacts of the selector group matrices are protected from unwanted transients during a disconnect operation by insuring that current is not flowing through them while they are being opened.

In accordance with the present invention, the relay contacts of the selector group matrices associated with the control lead ST are also protected from unwanted transient voltages. Originating junctors such as junctor 113 have a relay (not shown) connected to negative potential on lead ST. In this regard, in certain disconnect situations, ground will be standing on lead ST supplied from a contact (not shown) of supervisory relay TS (not shown). The disconnect sequence of the trunk circuit is such as to assure removal of this ground prior to release of the selector group matrix contacts A, B and C. This will avoid a steady-state current on lead ST being switched by the crosspoints.

Therefore, in view of the foregoing description, it should now be apparent that there is provided in accordance with the present invention an arrangement for seizing a supervisory unit, such as the register junctor, terminating junctor or trunk circuit, in response to the establishment of a path thereto, and a matrix-network protecting device, such as the relays 10H and CN having contacts for connecting the path to a source of potential (via the respective battery feed relays). As a result, the battery-feed relays and their connections to the main battery source of potential are isolated from the path being switched through the matrices to protect the crosspoints from unwanted transient surges. In this same regard, the matrix-protecting supervisory arrangement of the present invention also serves to protect the switching networks from unwanted surges as a result of potentials connected to the control leads through the network, and in this regard, for example, a ground potential present on lead ST of the trunk circuit is prevented from causing possible damage to the selector group relay contacts during a disconnect operation.

What is claimed is:

1. A supervisory arrangement for a communication switching system having at least one switching network and marker means for establishing a preselected path through the network to at least one supervisory unit having a source of potential associated therewith, said unit having an inlet to with a path may be established, said arrangement comprising:

seizure means responsive to the establishment of a path for generating a control signal and for supplying said signal to said supervisory unit; and network-protecting means in said supervisory unit for normally uncoupling said source of potential from the inlet of said unit and for connecting said path to said source of potential in response to said control signal.

2. A supervisory arrangement according to claim 1, wherein said seizure means responds to the establishment of said path by receiving a seizure signal from said marker means.

3. A supervisory arrangement according to claim 2, wherein said network-protecting means comprises a relay having normally open switching means for connecting said source of potential to said path.

4. A supervisory arrangement according to claim 3, wherein said control signal operates said relay.

5. A supervisory arrangement according to claim 4, wherein said switching network comprises a switching matrix having a plurality of relay crosspoint switches.

6. A supervisory arrangement according to claim 5, wherein said supervisory unit comprises a junctor.

7. A supervisory arrangement according to claim 1, further including a second supervisory unit, said seizure means responding to the establishment of another one of said paths by receiving a second seizure signal from said marker means.

8. A supervisory arrangement according to claim 7, wherein said network-protecting means includes a plurality of relays each having normally-open switching means for connecting said source of potential to the first-mentioned and said second paths.

9. A supervisory arrangement of claim 8, wherein said seizure means being further responsive to the establishment of said second path for generating a second control signal and for supplying it to said second supervisory unit, said second control signal operating one of said relays.

10. A supervisory arrangement according to claim 9, wherein said supervisory units are each junctors.

11. A supervisory arrangement according to claim 1, wherein said path further includes a control lead to the supervisory unit, said control lead being connected to a source of potential, further including means for disconnecting said source of potential from said control lead prior to releasing said path through said switching network.

* * * * *